US008924539B2

(12) United States Patent
Ferris et al.

(10) Patent No.: US 8,924,539 B2
(45) Date of Patent: Dec. 30, 2014

(54) COMBINATORIAL OPTIMIZATION OF MULTIPLE RESOURCES ACROSS A SET OF CLOUD-BASED NETWORKS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 247 days.

(21) Appl. No.: 12/953,718

(22) Filed: Nov. 24, 2010

(65) Prior Publication Data

US 2012/0131176 A1 May 24, 2012

(51) Int. Cl.
G06F 15/173 (2006.01)
G06F 9/46 (2006.01)
G06F 9/50 (2006.01)

(52) U.S. Cl.
CPC .................................. G06F 9/5072 (2013.01)
USPC ......................................... 709/224; 718/104

(58) Field of Classification Search
USPC ....................................................... 709/224
See application file for complete search history.

(56) References Cited

U.S. PATENT DOCUMENTS

| 6,463,457 | B1 | 10/2002 | Armentrout et al. |
| 7,313,796 | B2 | 12/2007 | Hamilton et al. |
| 7,356,591 | B2 * | 4/2008 | Mousseau et al. ............ 709/224 |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 7,870,044 | B2 * | 1/2011 | Robertson ....................... 705/34 |
| 7,996,525 | B2 * | 8/2011 | Stienhans et al. ............. 709/224 |
| 8,104,038 | B1 * | 1/2012 | Graupner ....................... 718/104 |
| 8,104,041 | B2 * | 1/2012 | Belady et al. .................. 718/105 |
| 8,229,999 | B2 * | 7/2012 | Devarakonda et al. ....... 709/201 |
| 8,239,509 | B2 * | 8/2012 | Ferris et al. .................... 709/223 |
| 8,250,215 | B2 * | 8/2012 | Stienhans et al. ............. 709/227 |
| 2001/0039497 | A1 | 11/2001 | Hubbard |
| 2002/0069276 | A1 | 6/2002 | Hino et al. |
| 2002/0165819 | A1 | 11/2002 | McKnight et al. |
| 2003/0037258 | A1 | 2/2003 | Koren |
| 2003/0110252 | A1 | 6/2003 | Yang-Huffman |

(Continued)

OTHER PUBLICATIONS

Zou, et al., "AI Planning and Combinatorial Optimization for Web Service Composition in Cloud Computing", May 17, 2010, Proceedings from Cloud Computing & Virtualization Conference, Singapore, 8 pp.*

(Continued)

*Primary Examiner* — Lynn Feild
*Assistant Examiner* — Timothy Sowa
(74) *Attorney, Agent, or Firm* — Lowenstein Sandler LLP

(57) ABSTRACT

Embodiments relate to combinatorial optimization of multiple resources across a set of cloud-based networks. In aspects, a set of usage histories can store patterns for users in a host cloud-based network recording the consumption of processor, memory, storage, operating system, application, or other resources subscribed to by the user. The user can be a corporation or other collective user. A deployment engine can identify similar target resources available in a set of target clouds. The engine can receive selection criteria for selecting target clouds for a migration of the user's deployment. In the combinatorial selection, each target cloud can independently supply one or more target resources. The engine can thus identify a series of combinations of target resources and target clouds supplying those resources to discover combinations of target clouds and target resources that can satisfy or optimize the selection criteria, such as cost or others.

20 Claims, 7 Drawing Sheets

(56) References Cited

U.S. PATENT DOCUMENTS

| | | |
|---|---|---|
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1* | 6/2005 | Fatula ............................ 707/8 |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfigllo et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhardt et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1* | 11/2009 | Nickolov et al. ............. 717/177 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1* | 12/2009 | Ferris ............................ 709/235 |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1* | 2/2010 | Ferris ............................ 718/1 |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0199285 A1* | 8/2010 | Medovich ..................... 718/104 |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1* | 11/2010 | Stienhans et al. ............. 707/803 |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055385 A1* | 3/2011 | Tung et al. ..................... 709/224 |
| 2011/0055396 A1 | 3/2011 | DeHaan |
| 2011/0055398 A1 | 3/2011 | DeHaan et al. |
| 2011/0055399 A1* | 3/2011 | Tung et al. ..................... 709/226 |
| 2011/0055588 A1 | 3/2011 | DeHaan |
| 2011/0099403 A1 | 4/2011 | Miyata et al. .................. 713/323 |
| 2011/0125894 A1* | 5/2011 | Anderson et al. ............. 709/224 |
| 2011/0126197 A1* | 5/2011 | Larsen et al. ..................... 718/1 |
| 2011/0126207 A1* | 5/2011 | Wipfel et al. .................. 718/104 |
| 2011/0126275 A1* | 5/2011 | Anderson et al. .................. 726/8 |
| 2011/0131335 A1* | 6/2011 | Spaltro et al. .................. 709/228 |
| 2011/0145392 A1* | 6/2011 | Dawson et al. ............... 709/224 |
| 2011/0179132 A1* | 7/2011 | Mayo et al. .................... 709/213 |
| 2011/0179162 A1* | 7/2011 | Mayo et al. .................... 709/224 |
| 2011/0258634 A1* | 10/2011 | Bonilla et al. ................. 718/105 |
| 2011/0264805 A1* | 10/2011 | Breitgand et al. ............. 709/226 |
| 2011/0295999 A1* | 12/2011 | Ferris et al. .................... 709/224 |
| 2012/0016681 A1* | 1/2012 | Joergensen et al. ............. 705/1.1 |
| 2012/0131594 A1* | 5/2012 | Morgan ......................... 718/105 |
| 2012/0137002 A1* | 5/2012 | Ferris et al. .................... 709/226 |
| 2012/0221955 A1* | 8/2012 | Raleigh et al. ................. 715/736 |

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multipie Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pgs.

White Paper—"rPath Versus Other Software Appliance Approaches", Mar. 2008, rPath, Inc., www.rpath.com, 9 pgs.

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

(56) References Cited

OTHER PUBLICATIONS

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Managment Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "System and Methods for Migrating Subscribed Services from a Set of Clouds to a Second Set of Clouds", U.S. Appl. No. 12/957,281, filed Nov. 30, 2001.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al. "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

COMBINATORIAL OPTIMIZATION OF MULTIPLE RESOURCES ACROSS A SET OF CLOUD-BASED NETWORKS

FIELD

The invention relates generally to systems and methods for the combinatorial optimization of multiple resources across a set of cloud-based networks, and more particularly, to platforms and techniques for discovering optimized or otherwise preferred or desired combinations of clouds from which multiple or diverse processing, memory, storage, and/or other resources can be migrated and subscribed based on the usage history of a user.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of deployment analysis, a cloud operator or other entity may collect and store the usage history of a user reflecting their consumption of processor, memory, application, and/or other resources in a host or existing cloud. The operator of a further cloud, the user themselves, and/or other entity may wish to explore the possible migration of those subscribed resources to a set of new target clouds. The user or other entity performing that migration analysis may wish to explore those possible deployments on a combinatorial or "mix-and-match" basis, for instance, to achieve the best possible cost ratio for processor and memory, while achieving the greatest possible redundancy for storage capabilities at the same time. When presented with more complex deployment choices, existing cloud tools do not permit or do not assist a user with the task of evaluating a range of possible different cloud-resource combinations over diverse cloud sets, on a comprehensive basis. It may be desirable to provide systems and methods for combinatorial optimization of multiple resources across a set of cloud-based networks, in which cloud-related tools and resources can perform a discovery and evaluation process to determine combinatorially optimized groupings of individual resources and corresponding clouds, to present the user with the best available or preferred combined target choices in their cloud deployment options.

DESCRIPTION

Figure 1:
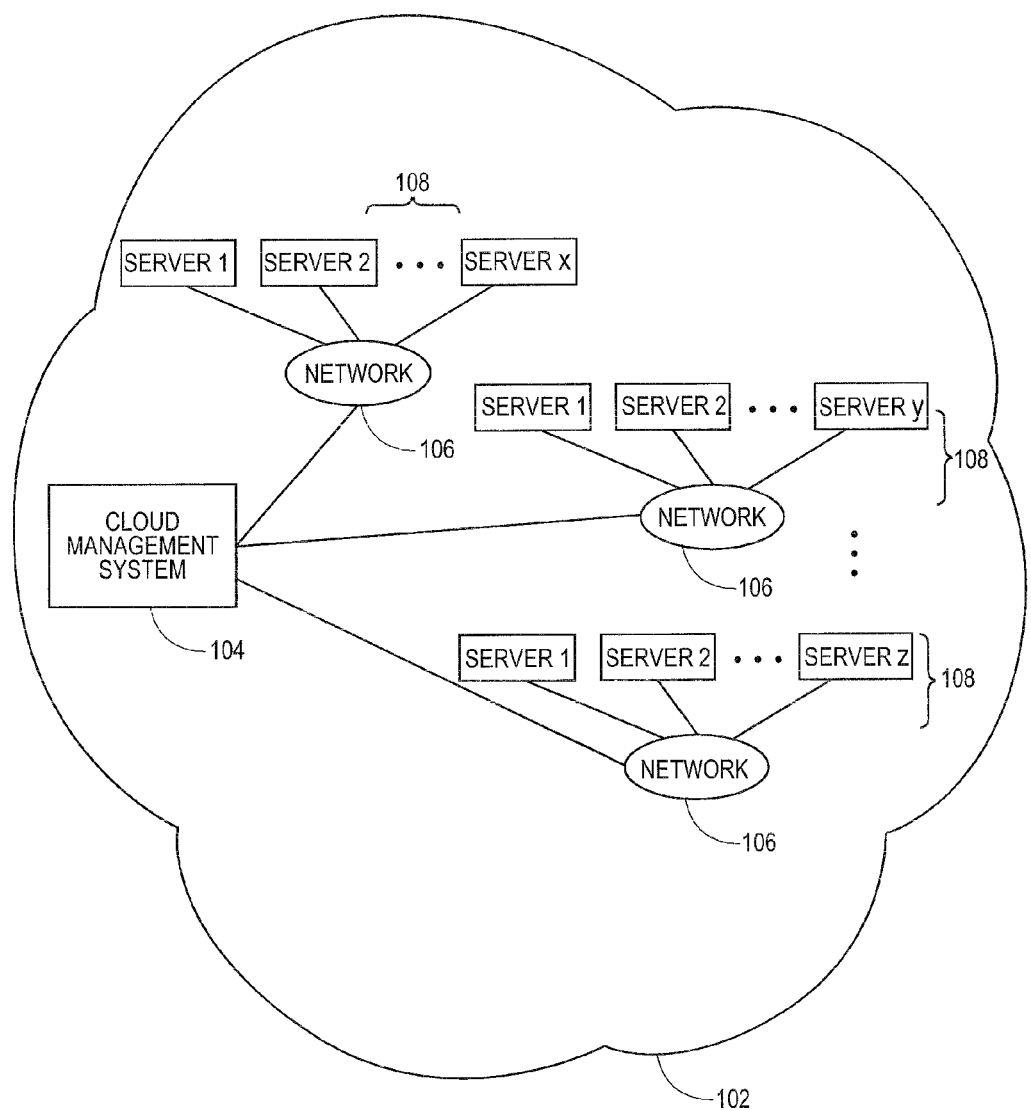
FIG. 1 illustrates an overall cloud system architecture in which various aspects of systems and methods for combinatorial optimization of multiple resources across a set of cloud-based networks can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
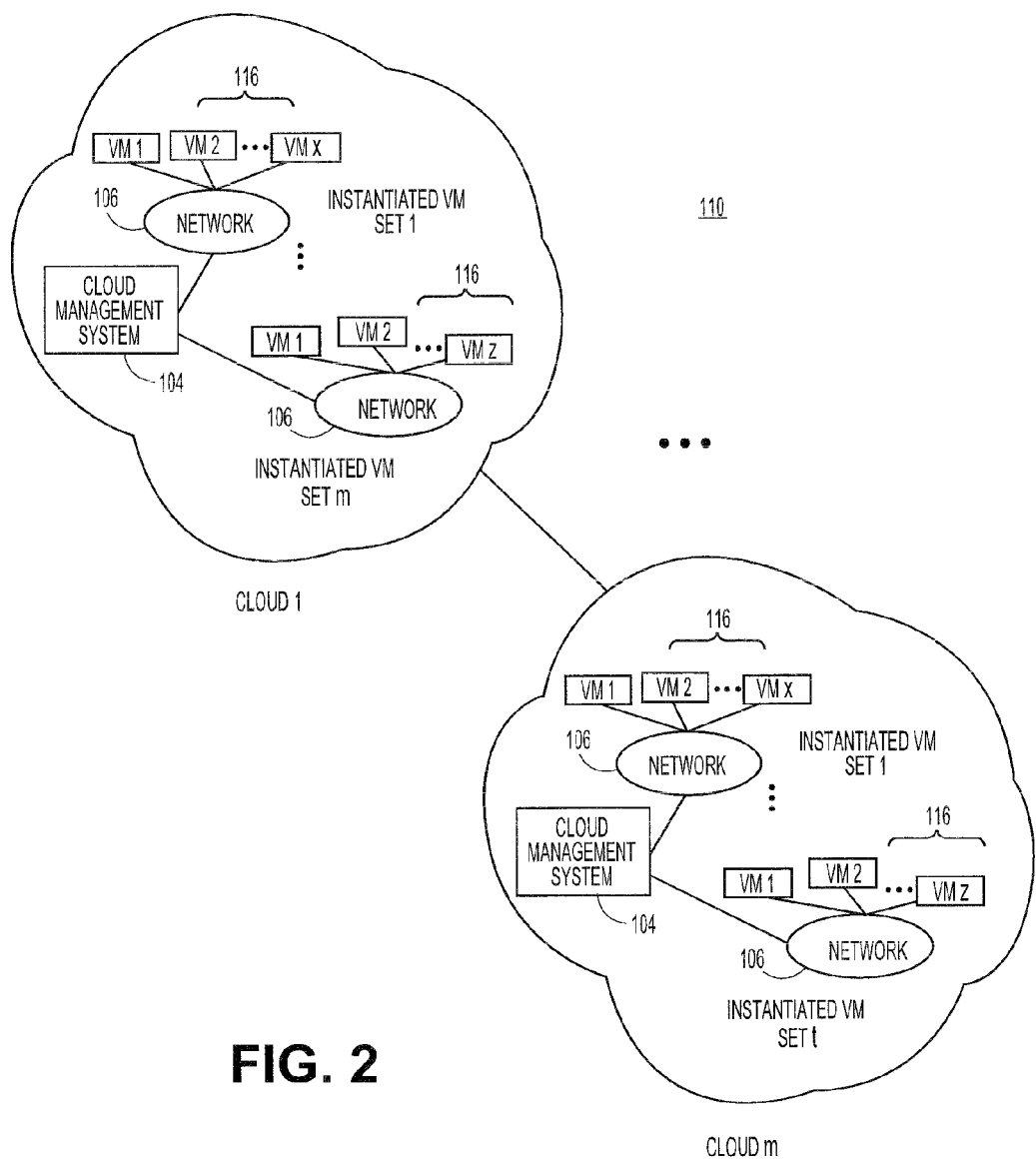
FIG. 2 illustrates an overall cloud system architecture in which various aspects of systems and methods for combinatorial optimization of multiple resources across a set of cloud-based networks can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the KERNAL-BASED VIRTUAL MACHINE (KVM™) available from RED HAT®, INC. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a JAVA™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
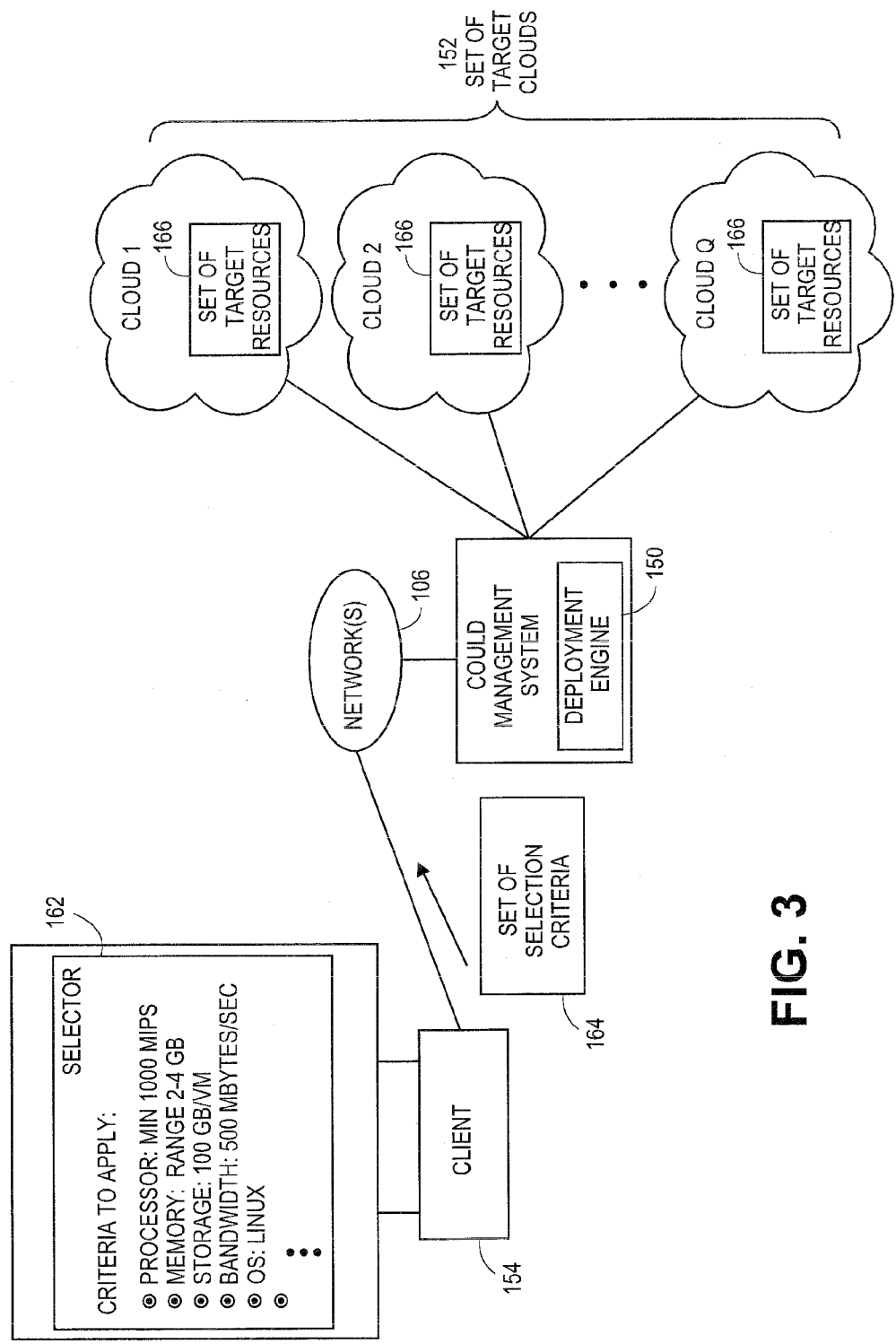
FIG. 3 illustrates a network configuration in which systems and methods for combinatorial optimization of multiple resources across a set of cloud-based networks can be practiced, including capture of user-specified criteria for resource selection and deployment, according to various embodiments.

Aspects of the present teachings relate to platforms and techniques in which the usage history for a given user or users can be decomposed and analyzed to determine the usage needs, patterns, attributes, and/or other characteristics of a user's resource consumption in a host cloud, and determine an optimized, maximized, improved, and/or otherwise desired set of target cloud/resource combinations for potential migration of that same usage and consumption to new cloud combinations. FIG. 3 shows an illustrative network configuration in which systems and methods for combinatorial optimization of multiple resources across a set of cloud-based networks can be implemented, according to various embodiments. In embodiments as shown, an administrator or other user can operate a client 154 and/or other device, site, or service to access a deployment engine 150 to perform combinatorial analyses, studies, or modeling of potential cloud migration scenarios to a set of target clouds 152. According to aspects, the deployment engine 150 can maintain a target resource record 156 in a cloud store 138 registering the set of target resources 166 available for subscription in the set of target clouds 152. The set of target resources 166 reflected in the target resource record 156 can include, merely for instance, processor throughput, memory amounts, memory speed and/or types, storage amounts and/or types, storage backup capability, communications resources such as communications ports and bandwidth, operating system resources, application resources, security resources, and/or other hardware, software, services, and/or other resources deployed by or available from or in the set of target clouds 152.

In aspects, the deployment engine 150 can generate and present a selection dialog 162 to the user to select different potential migration or deployment parameters, configurations, providers, and/or other alternatives or factors to be used in assessing various possible deployment combinations and results. The deployment engine 150 can access a set of usage history data 158 for one or more users, to extract consumption data and other information related to a user's existing or historical patterns of resource consumption in a set of host clouds 160, to which the user is currently subscribed, or has in the past subscribed. The set of usage history data 158 can for instance be stored in a cloud store 138 associated with the cloud management system 104, and/or other local or remote database or other storage.

In various aspects, the selection dialog 162 can generate a selection dialog and/or other input interface to receive a set of selection criteria 164 from the user. The set of selection criteria 164 can include the types, categories, values, ranges, weights, and/or other information or attributes related to the set of target resources 166 to which the administrator or other user, possibly including a set of network users and/or other collective user base, wishes to explore for potential subscription and use in the set of target clouds 152. In aspects, the set of selection criteria 164 can include selections such as the cost, network performance level or rate, type, compatibility, and/or other details for a given resource or group of resources in the set of target clouds 152. For instance, the set of selection criteria 164 can present selections for, and/or receive user inputs, for processor resources that may be specified to include criteria such as "minimum 10000 MIPS (millions of instructions per second), "x86 processor architecture," "minimum quad processor architecture," "max cost 5 cents per hour," "minimum uptime 99.0%," and/or specifications, details, thresholds, or criteria. In aspects, different resources in the set of target resources 166 can receive different user-specified criteria in the set of selection criteria 164 for evaluation against the set of target clouds 152 and their corresponding hosted resources.

Figure 4A:
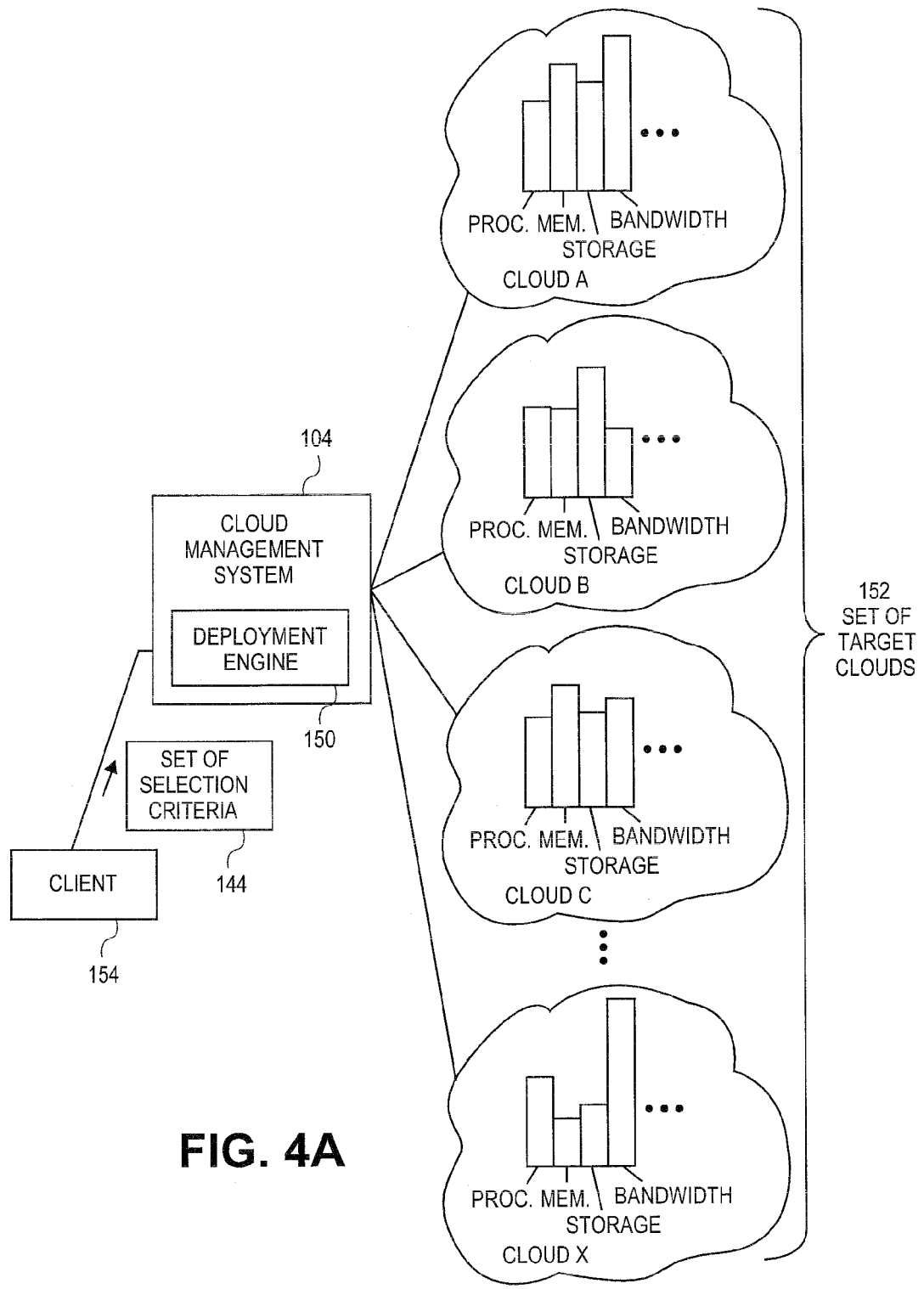
FIGS. 4A-4C illustrate various comparisons and analyses that can be performed on resources to be deployed to a set of target clouds in combinatorial fashion with illustrative target cloud results, according to various aspects.
Figure 4B:
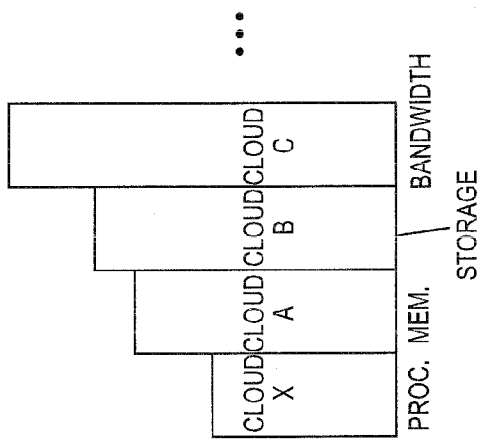
Figure 4C:
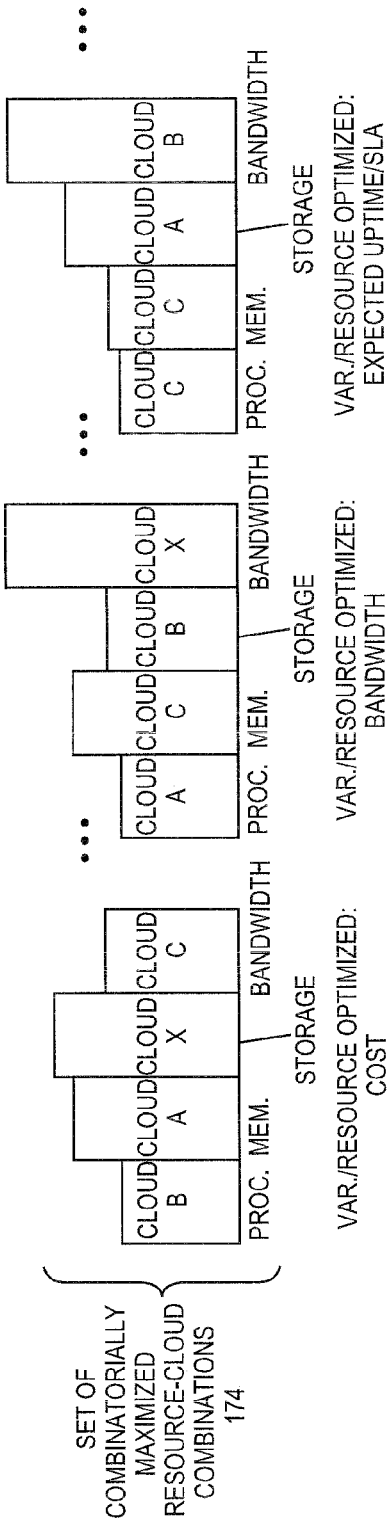

In terms of identifying and evaluating resources in the set of target resources 166 that match or satisfy the set of selection criteria 164, FIGS. 4A-4C illustrate various analyses, calculations, results, comparisons, and/or other operations that the deployment engine 150 can perform or invoke to locate or identify individual resources that meet or correspond to the set of selection criteria 164 in the set of target clouds 152. In embodiments as shown in FIG. 4A, each cloud in the set of target clouds 152 can host, contain, provide, and/or otherwise make accessible a set of target resources 166, such as processor resources, memory resources, storage resources, communications bandwidth, and/or other hardware, software, appliances, and/or other resources. In aspects as generally shown, each cloud in the set of target clouds 152 may host a different set, array, group, or collection of set of target resources 166. In aspects as shown, a cloud hosting a greater number, degree, and/or other quantity of a resource can be shown with a higher bar in the bar graph representing the collection of resources present or available in the set of target clouds 152. In aspects, the resources present or available in the set of target clouds 152 can change over time, for instance depending on the resources located and procured by the cloud management system 104 to offer or deploy for users of the cloud.

In aspects, in general the deployment engine 150 can apply the set of selection criteria 164 to the set of target resources 166 hosted in each cloud of the set of target clouds 152, to determine those clouds which host one or more resources matching or satisfying the criteria the user wishes to apply to those respective criteria. In aspects as for instance illustrated in FIG. 4B, in cases the user may specify via the set of selection criteria 164 that they simply to do nothing other than to maximize the degree or quantity of each given resource which they wish to consider in the set of target clouds 152. In such cases, the deployment engine 150 can identify the cloud in the set of target clouds 152 which maximizes the degree or quantity of each resource independently, and present the user (for instance via the selection dialog 162) with a combined set of clouds and resources drawn from the set of target clouds 152 which match the set of selection criteria 164 to the highest degree or quantity. In cases, the resulting combination of clouds in the set of target clouds 152 and the resources to be taken from those clouds can be a unique or single set of cloud/resource pairings. In cases, the more than one target cloud may be able to provide the same (or same to within a predetermined margin) degree or quantity of a given resource, so that multiple or alternative cloud combinations can generate or achieve the same maximized or best-available results. In the latter case, the selection dialog 162 may present a list and/or other dialog to present the user with the maximized or best-available results, to permit the user to consider and/or choose the combination they prefer.

According to further aspects, and as for instance generally illustrated in FIG. 4C, in cases the set of selection criteria 164 may not specify criteria requesting only maximization of desired resources, but instead, compound and/or otherwise more complex criteria. For instance, a user may specify in the set of selection criteria 164 that they wish to obtain or consider a set of processor resources capable of a range of between 1000 and 2000 MIPS per virtual machine, with a minimum memory allocation of 2 Gigabytes per virtual machine, each machine being allocated at least 100 Gigabytes of permanent or persistent storage, with an allocated communications bandwidth of 100 Megabytes/sec over port 180 between 6:00 a.m. and 9:00 pm and at least 40 Megabytes/sec over that port at other times, all with a total subscription cost of not more than 15 cents per hour per virtual machine, on an average basis. In cases where compound and/or otherwise complex specifications are provided to match to the set of target resources 166 available in the set of target clouds 152, the deployment engine 150 may perform an exhaustive search on resources/cloud combinations in the set of target clouds 152 to determine the combinations potentially satisfying the set of selection criteria 164. For instance, the deployment engine 150 may first determine all clouds in the set of target clouds 152 capable of hosting or delivering processor resources in the range of 1000 to 2000 for each virtual machine. The deployment engine 150 then may select a first target cloud to potentially host that resource, and then seek out exhaustively all clouds that can host or supply a minimum memory allocation of 2 Gigabytes per machine if that first target cloud were selected to host the requested processor resources. The deployment engine 150 may then select a second target cloud to potentially host the processor resource meeting the specified criteria, then evaluate all potential combinations of target clouds to host the specified memory resources (in this example, a minimum or threshold of 2 Gigabytes) given the hosting of the processor resources in the second cloud. The deployment engine 150 can then continue to repeat the analysis of all combinations of clouds potentially matching one resource criterion or criteria against all potential pairing or combinations of clouds supplying all other desired resources satisfying all other criteria specified in the set of selection criteria 164, in exhaustive combinatorial fashion. The result of that program of analysis can produce a set of combinatorially-maximized cloud-resource combinations 174, as illustrated in FIG. 4C. In aspects, each potential collection of target resources and target clouds to host those resources in set of combinatorially-maximized cloud-resource combinations 174 can represent a possible solution to the constraints imposed by the set of selection criteria 164. In aspects, there may be no general unique or single set of combinatorially-maximized cloud-resource combinations 174 which best satisfies the set of selection criteria 164, but instead a series or collection of possible solutions, some of which can be optimized around or based on separate variables or criteria in the set of selection criteria 164, such as overall cost, communications bandwidth, expected uptime under a Service Level Agreement (SLA), and so forth. In regards, therefore, the deployment engine 150 can produce a selection or possible combination or alternative combinations of target clouds and target resources which can variously represent an optimized, maximized, best-available, most efficient, preferred, as-desired, enhanced, threshold or minimum, and/or otherwise selected combination of resources and clouds to host those resources in the set of target clouds 152. In embodiments, the set of combinatorially optimized cloud-resource combinations 174 can thereby also or instead incorporate those target resource/target cloud combinations representing a net benefit compared to the existing host deployment in any one or more resource or factor of the user's choosing, rather than a strictly optimized or maximized set of quantities for those resources or factors.

Figure 5:
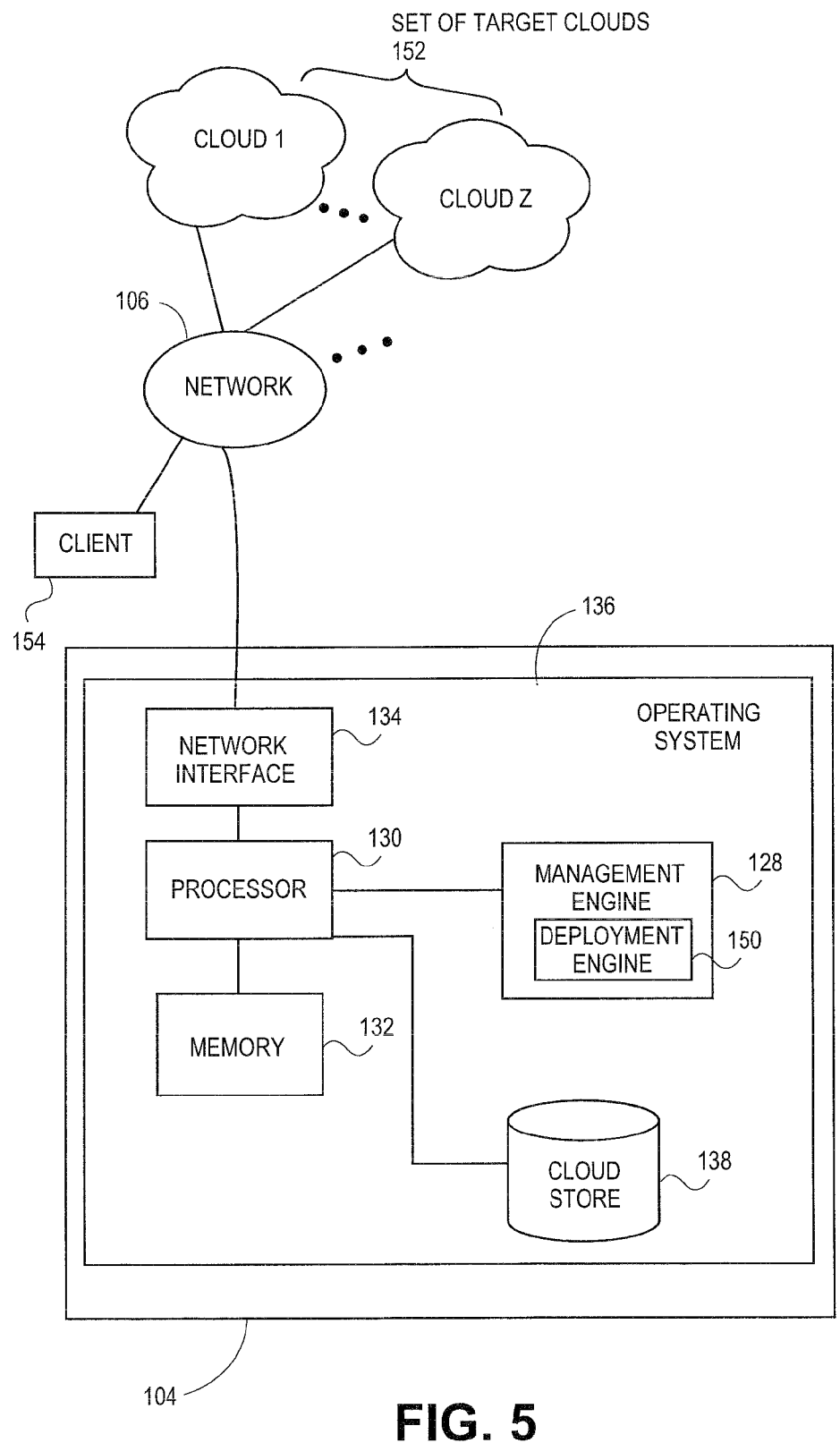
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, deployment engine 150, client 154, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the LINUX™ operating system, the UNIX™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the deployment engine 150, the set of selection criteria 164, and/or other interfaces, applications, services, and/or logic. Other configurations of the cloud management system 104, associated network connections, and other hardware, software, and service resources are possible. It may be noted that in embodiments, the client 154, and/or other hardware machines, platforms, or engines can comprise the same or similar resources as cloud management system 104, or can be configured with different hardware and software resources.

Figure 6:
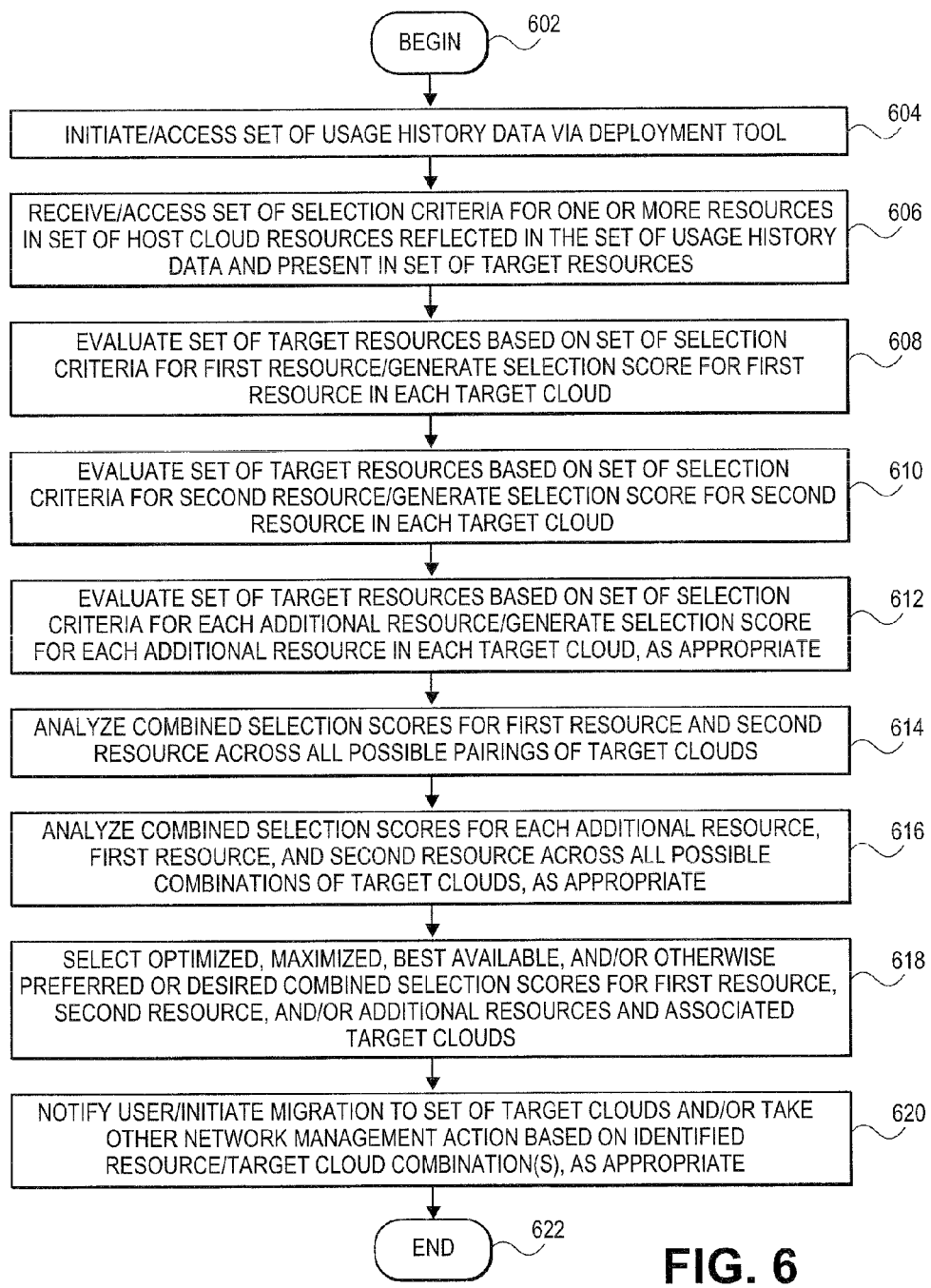
FIG. 6 illustrates a flowchart for the analysis and processing of potential resource and cloud combinations using user-specified selection criteria in systems and methods for combinatorial optimization of multiple resources across a set of cloud-based networks, according to various embodiments.

FIG. 6 illustrates a flowchart of overall processing to perform multi-resource, multi-cloud analysis and optimization activity, according to various embodiments of the present teachings. In 602, processing can begin. In 604, an administrator, cloud operator, end-user, and/or other user or operator can initiate, extract, read, and/or otherwise access the set of usage history data 158 via the deployment engine 150, and/or other logic, site, or interface. In 606, the deployment engine 150 can receive, for instance as input from a user or from an automated source, and/or otherwise access the set of selection criteria 164 for analyzing, optimizing, maximizing, and/or otherwise selecting resources or groups of resources from the set of target clouds 152. In aspects, the set of selection criteria 164 can specify selection or filtering criteria for one or more resources in the set of host clouds 160 which are reflected or present in the set of usage history data 158, and which are likewise present in the set of target resources 166.

In 608, the deployment engine 150 can evaluate the set of target resources 166 located in the set of target clouds 152 based on the set of selection criteria 164 for a first resource, such as, merely illustratively, processor speed or powers, and generate a selection score 170 for the first resource for each cloud in the set of target clouds 152. In 610, similarly, the deployment engine 150 can evaluate the set of target resources 166 located in the set of target clouds 152 based on the set of selection criteria 164 for a second resource, and generate a selection score 170 for second resource, such as, merely illustratively, memory amount or speed, for each cloud in the set of target clouds 152. In 612, the deployment engine 150 can evaluate the set of target resources 166 located in the set of target clouds 152 based on the set of selection criteria 164 for each additional resource under evaluation, in cases where one or more additional resources are specified, and generate a selection score 170 for each additional resource for each cloud in the set of target clouds 152, as appropriate.

In 614, the deployment engine 150 can analyze the combined selection scores 170 for the first resource and the second resource across all possible pairings of clouds in the set of target clouds 152. For instance, different pairings of target clouds can be assigned different total scores based on a sum of the selection score 170 for each of the first and second resource in that pair of clouds. In 616, the deployment engine 150 can analyze the combined selection scores 170 for each additional resource, along with the first resource and second resource, across all possible combinations of target clouds in the set of target clouds 152, as appropriate. For instance, the combination of three or more target clouds can be assigned a combined selection score 170 based on the sum of the selection score 170 for each of the resources hypothetically hosted in one or more individual cloud.

In 618, the deployment engine 150 can select an optimized, maximized, best available, and/or otherwise preferred or desired combined selection score(s) 170 for the first resource, second resource, and/or additional resources and associated groups or sets of target clouds in the set of target clouds 152. In 620, the deployment engine 150 can notify the user of the optimized or otherwise preferred combinations of target clouds and resource assignments in those target clouds, and/or initiate migration or deployment to the set of selected target clouds to subscribe to those resources in optimized or otherwise preferred combinations of clouds, as appropriate. In 622, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. For further example, while embodiments have been described in which a user connects to or accesses the deployment engine 150 via one client 154, in embodiments, multiple clients, portals, services, and/or other access points to the deployment engine 150 can be used. Likewise, while embodiments have been described in which one deployment engine 150 operates to manage the deployment activities of one or more users to a set of target clouds 152, in embodiments, multiple deployment engines and/or other logic or services can perform the same or similar logic to manage deployment options. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
receiving, by a hardware processor, a request to provision a set of virtual machines;
accessing, by the hardware processor, a resource usage history comprising a record of historical consumption of a plurality of resources;
determining, by the hardware processor, a set of selection criteria for the set of virtual machines in view of an analysis of the resource usage history;
evaluating, by the hardware processor, a plurality of target resources associated with a set of target resource providers in view of the set of selection criteria;
selecting, by the hardware processor, a first set of target resources associated with at least one resource provider; and
selecting, by the hardware processor, a second set of target resources associated with at least one resource provider, wherein the second set of target resources is selected in view of the selected first set of target resources, wherein the set of virtual machines are to be provisioned to use the first set of target resources and the second set of target resources.

2. The method of claim 1, wherein the plurality of resources comprises at least two of processor resources, memory resources, storage resources, bandwidth resources, communications port resources, operating system resources, application resources, or appliance resources.

3. The method of claim 1, wherein the set of target resource providers comprises a set of target clouds, and wherein the set of selection criteria comprises at least one of a subscription cost, a minimum number of software images to be deployed in the set of target clouds, a maximum number of software images to be deployed in the set of target clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, or a service level agreement specification.

4. The method of claim 1, wherein evaluating the plurality of target resources comprises comparing the set of selection criteria for at least one of the target resources across at least two resource providers of the set of target resource providers.

5. The method of claim 4, wherein comparing the set of selection criteria for at least one of the target resources across at least two of the set of target resource providers comprises comparing the set of selection criteria for at least one of the target resources across all resource providers of the set of target resource providers.

6. The method of claim 4, wherein the set of target resource providers comprises a set of target clouds, and wherein evaluating a plurality of target resources hosted in the set of target clouds comprises comparing the set of selection criteria for at least two of the target resources across at least two clouds of the set of target clouds.

7. The method of claim 6, wherein comparing the set of selection criteria for at least two of the target resources across at least two clouds of the set of target clouds comprises determining a selection score for each of the at least two of the target resources evaluated against the set of selection criteria.

8. The method of claim 7, wherein comparing the set of selection criteria for at least two of the target resources across at least two clouds of the set of target clouds comprises maximizing the selection score for each of the at least two of the target resources.

9. The method of claim 8, wherein selecting the first set of target resources comprises selecting a first set of target clouds for which the selection score for at least one of the target resources is maximized.

10. The method of claim 9, wherein selecting the second set of target resources comprising selecting a second set of target clouds, wherein the second set of target clouds is selected when a selection score for the second set of target resources is within a predetermined range.

11. The method of claim 6, wherein comparing the set of selection criteria for at least two of the target resources across at least two clouds of the set of target clouds comprises comparing the set of selection criteria for all of the target resources across at least two clouds of the set of target clouds.

12. A computing device, comprising:
an interface to a data store, the data store to store resource usage history data comprising a record of historical consumption of a plurality of resources;
a memory; and
a hardware processor, coupled to the memory and communicating with the data store via the interface, the hardware processor to:
receive a request to provision a set of virtual machines,
determine a set of selection criteria for the set of virtual machines in view of an analysis of the resource usage history data;
evaluate a plurality of target resources associated with a set of target resource providers in view of the set of selection criteria,
select a first set of target resources associated with at least one resource provider; and
select a second set of target resources associated with at least one resource provider, wherein the second set of target resources is selected in view of the selected first set of target resources, wherein the set of virtual machines are to be provisioned to use the first set of target resources and the second set of target resources.

13. The computing device of claim 12, wherein the plurality of resources comprises at least two of processor resources, memory resources, storage resources, bandwidth resources, communications port resources, operating system resources, application resources, or appliance resources.

14. The computing device of claim 12, wherein the set of target resource providers comprises a set of target clouds, and wherein the set of selection criteria comprises at least one of a subscription cost, a minimum number of software images to be deployed in the set of target clouds, a maximum number of software images to be deployed in the set of target clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, or a service level agreement specification.

15. The computing device of claim 12, wherein the set of target resource providers comprises a set of target clouds to host the plurality of target resources, and wherein evaluating the plurality of target resources hosted in the set of target clouds comprises comparing the set of selection criteria for at least one of the target resources across at least two clouds of the set of target clouds.

16. The computing device of claim 15, wherein comparing the set of selection criteria for at least one of the target resources across at least two of the set of target clouds comprises comparing the set of selection criteria for at least one of the target resources across all clouds of the set of target clouds.

17. The computing device of claim 15, wherein evaluating a plurality of target resources hosted in the set of target clouds comprises comparing the set of selection criteria for at least two of the target resources across the at least two clouds of the set of target clouds.

18. The computing device of claim 17, wherein comparing the set of selection criteria for at least two of the target resources across at least two clouds of the set of target clouds comprises determining a selection score for each of the at least two of the target resources evaluated against the set of selection criteria.

19. A non-transitory computer readable storage medium comprising instructions that, when executed by a hardware processor, cause the hardware processor to perform operations comprising:

receiving, by the hardware processor, a request to provision a set of virtual machines;

accessing, by the hardware processor, a resource usage history comprising a record of historical consumption of a plurality of resources;

determining, by the hardware processor, a set of selection criteria for the set of virtual machines in view of an analysis of the resource usage history;

evaluating, by the hardware processor, a plurality of target resources associated with a set of target resource providers in view of the set of selection criteria;

selecting, by the hardware processor, a first set of target resources associated with at least one resource provider; and selecting, by the hardware processor, a second set of target resources associated with at least one resource provider, wherein the second set of target resources is selected in view of the selected first set of target resources, wherein the set of virtual machines are to be provisioned to use the first set of target resources and the second set of target resources.

20. The non-transitory computer readable storage medium of claim 19, wherein evaluating the plurality of target resources comprises comparing the set of selection criteria for at least one of the target resources across at least two resource providers of the set of target resource providers.

* * * * *